United States Patent
Matthews (10) Patent No.: US 7,970,989 B2
(45) Date of Patent: Jun. 28, 2011

(54) WRITE ORDERING ON DISK CACHED PLATFORMS

(75) Inventor: Jeanna N. Matthews, Massena, NY (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 11/480,047

(22) Filed: Jun. 30, 2006

(65) Prior Publication Data

US 2008/0005465 A1 Jan. 3, 2008

(51) Int. Cl.
*G06F 12/00* (2006.01)
(52) U.S. Cl. ............ 711/113; 711/4; 711/100; 711/102; 711/103; 711/114; 711/133; 711/134; 711/135; 711/136; 711/144; 711/145; 711/159; 711/160; 410/5; 410/6; 410/36; 410/39; 410/52; 410/54
(58) Field of Classification Search .............. 711/4, 100, 711/112, 114, 133–136, 144–145, 159–160, 711/102–103, 113; 710/5–6, 36–39, 52–54
See application file for complete search history.

(56) References Cited

U.S. PATENT DOCUMENTS

| | | | | |
|---|---|---|---|---|
| 5,636,355 A | * | 6/1997 | Ramakrishnan et al. | 711/113 |
| 5,638,534 A | * | 6/1997 | Mote, Jr. | 711/158 |
| 5,727,183 A | * | 3/1998 | Takahashi | 711/143 |
| 6,101,568 A | * | 8/2000 | Richardson | 710/310 |
| 6,880,042 B2 | * | 4/2005 | Hashimoto | 711/112 |
| 7,552,294 B1 | * | 6/2009 | Justiss | 711/161 |
| 2004/0243760 A1 | * | 12/2004 | Dahman et al. | 711/113 |
| 2005/0125606 A1 | * | 6/2005 | Garney | 711/113 |
| 2005/0138282 A1 | * | 6/2005 | Garney et al. | 711/113 |
| 2007/0233947 A1 | * | 10/2007 | Coulson et al. | 711/113 |

\* cited by examiner

*Primary Examiner* — Tuan V Thai
*Assistant Examiner* — Zhuo H Li
(74) *Attorney, Agent, or Firm* — Blakely, Sokoloff, Taylor & Zafman LLP (57) ABSTRACT

A hard disk cache includes entries to be written to a disk, and also includes ordering information describing the order that they should be written to the disk. Data may be written from the cache to the disk in the order specified by the ordering information. In some situations, data may be written out of order. Further, in some situations, clean data from the cache may be combined with dirty data from the cache when performing a cache flush.

12 Claims, 5 Drawing Sheets

WRITE ORDERING ON DISK CACHED PLATFORMS

FIELD

The present invention relates generally to mass storage, and more specifically to hard disk caching.

BACKGROUND

Disk input/output (I/O) is one of the biggest bottlenecks on a computer platform. Caching of disk drive data in a cache memory offers significantly improved performance, while reducing power consumption of the system, as the associated drive can be kept spun down for longer periods of times. In a writeback cache system write data is written into the cache on operating system (OS) request, and at some later time, the dirty data is written to the disk drive as a so-called lazy write.

Such a disk cache may be maintained physically separate from an associated disk drive such as a hard drive. As an example, the disk cache may be a non-volatile memory coupled to a system motherboard, while the disk drive is a separate physical enclosure, typically connected to the motherboard via a connector and cabling. However, a problem with this approach is that the associated disk drive cannot be removed from the system and used on another system unless the cache is first flushed. Also, such a drive may have a mix of old and new data, and is thus scrambled and unusable on a second system.

Further, if the drive is used on the second system and its data is modified, and then the drive is returned to the original system, the cache then contains stale data and may provide wrong data to the OS responsive to read requests. Such separation scenarios commonly occur, as when a user's system crashes and has hard errors an information technology (IT) person may remove the disk drive from the original system and move it to a different system (e.g., a loaner system) for the user. The user works on the loaner system (thereby modifying data on the disk drive) while the original system is repaired. The drive is later returned to the original system containing the cache. However, the data in the disk cache and disk drive are incoherent, and thus errors are likely to occur.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In various embodiments of the present invention, the state of a disk drive or other mass storage may be maintained coherently with a cache such as a disk cache. The drive and/or cache can thus be moved to another system and is usable there. Furthermore, various embodiments of the present invention allow the drive to be returned to the original system without compromising data integrity. As described further below, in some embodiments the cache memory may be remote from the associated disk drive. Further, the cache memory may be a platform-based memory. That is, the memory may be associated with a platform (e.g., affixed to a motherboard).

To maintain coherency, each write operation to the disk from the disk cache may be performed in the same order as that issued by an operating system (OS) to a disk subsystem (i.e., disk cache and disk drive). Thus on each write issued by the OS that is inserted into the cache, a sequence number may be maintained specifying the order of the writes. Thus, when an OS issues a write to a disk sector X that is chosen to be inserted into the disk cache, the data is inserted in the disk cache along with metadata that contains a globally-maintained sequence number (S). The value of the sequence number is then incremented. On a subsequent write by the OS to a disk sector Y that is selected for insertion in the cache, the data is inserted into the cache with the incremented value of S (followed by another increment to S). The value of S may be maintained in a non-volatile or volatile memory (e.g., a dynamic random access memory (DRAM)), and may be saved on shutdown for continuation on the next reboot (and in case of power-failures/crashes, S may be recovered as part of a crash recovery algorithm). Note that a sequence number in accordance with an embodiment of the present invention may be used for other purposes such as for efficient non-volatile memory write operations (e.g., to reduce latencies).

In the case of a write to a disk sector that already exists in the cache, the existing cache data may not be updated, rather another copy of the data may be inserted with the incremented sequence number count. This ensures that if data in sector X is written (X1) followed by sector Y followed by sector X again (X2), then writes to the drive occur in that order (X1, Y, X2). In some embodiments of the present invention, existing cache data may be updated in the case of a write to a disk sector that already exists in the cache. For example, if the data already existing in the cache is the most recently written data (as indicated by the sequence number S), then the cache entries may be combined. For example, the sequence X1 followed immediately by X2 can be collapsed into simply X2. Also in some embodiments, if data already existing in the cache is the same data as in the disk write, then a new cache entry may not be made. For example in the case of X1, Y, X2, if X1 and X2 are writes of the same data pattern then it can be combined to X1, Y only. For read-hit processing (i.e., to provide data from the disk cache to the OS responsive to a read request) to such updated sectors, only the most recently written data may be returned in all cases.

Later, sequence numbers may be used when flushing dirty data from the cache to the disk drive, typically at lazy times or in case of power events such as shutdowns, hibernates, suspends, or during crash/power-fail recovery. Specifically, sectors are generally written out from the cache to the disk drive in the order specified by the sequence numbers. If a decision is made to not insert newly written data in the cache, all previously written data that is stored in the cache may first be written out to disk. Similarly, on eviction of any dirty element from the cache, all elements written before it may first be written out to the disk.

In some embodiments of the present invention, dirty data in the cache may be written to the disk drive out of order as long as the disk write contains all the most dirty data. For example, the oldest "N" dirty cache entries may be written to the disk in a single disk request as long as they are the oldest dirty cache entries in the cache even if the oldest entry is not the first in the disk write request. For example, if writes X, Y, Z occur and the written disk locations are adjacent then it is permissible to combine these into a single write that contains the writes in a different order such as Z, X, Y. This may decrease the time needed to process the disk write, and may not change the result since many disks reorder write operations in a write request anyway.

Also in some embodiments, dirty data may be flushed out of order between OS flushes. In these embodiments, whenever a disk flush or sync command arrives to the disk drive, the next dirty cache entry written may include an indication that it is at a flush epoch boundary. A flush epoch thus consists of all the cache entries written to disk between OS flush requests. In these embodiments, the dirty data written within a flush epoch may be written to disk in any order that minimizes the time to flush the data rather than requiring that the data be flushed in the exact same order it arrived at the disk. This may reduce the time needed for the flush operation, and may not change the result since many disks reorder write operations in a write request anyway.

In still further embodiments, dirty cache entries may be combined with each other or with clean cache entries to increase the size of a disk write request. For example, in some embodiments, cache entries with consecutive sequence numbers that correspond to adjacent locations on a disk may be combined in a single disk write request to decrease the overhead associated with making a disk write request. Further, if the cache includes clean entries that can be used to fill a gap between two non-adjacent (on disk) dirty cache entries with consecutive sequence numbers, then a larger disk write request may be produced that has many adjacent (on disk) cache entries, where some of the cache entries are dirty and some are clean. Writing clean data has no effect on the state of the disk, but if it allows multiple dirty entries to be written in a single disk write request, performance gains may result.

For performance reasons, sometimes write requests issued by an OS are not inserted into the disk cache, e.g., for streaming data. In such a case, the cache may be flushed (maintaining the write order, as described above) before sending OS-issued write requests directly to the disk. In this way write ordering is maintained. Since flushing the cache at such demand times may cause low system performance, in some embodiments the cost of the non-insertion (e.g., based on how many dirty sectors are in the cache) may be evaluated, and data of the write requests may be inserted into the cache, even though it may be deemed to be streaming data, if the cost estimate is above a predetermined threshold. That is, if the amount of dirty data in the cache is greater than a given threshold, data of the current (e.g., streaming) write requests may instead be written into the disk cache.

This method of inserting, updating, evicting and flushing the dirty contents of the cache ensures that the drive may at worst be some number of write accesses behind the data in the disk cache, but is never in a state in which out-of-order data is written to it that essentially scrambles the drive and makes the contents unusable. Accordingly, the coherent but possibly somewhat stale drive may be moved to alternate systems and used as needed. The drive data may potentially be stale (and thus a user may lose a last portion of data written to the drive by the OS), but the data is never corrupt/scrambled. Accordingly, a disk cache in accordance with an embodiment of the present invention may be consistent with disk drive lazy write policies: if power fails, there may be a small amount of user data rollback (e.g., several minutes of lost data).

If a drive is migrated to a second system (e.g., pursuant to a hard error on a first system, a user upgrade or the like) the data in the drive may be stale, and a user may lose some amounts of recent data. To prevent such data loss, in various embodiments the drive may be guaranteed to be no more than, e.g., a certain time (t) in seconds stale. This guarantee may be realized by flushing the cache at a predetermined interval (e.g., every t seconds). A variety of methods can be used to set this threshold (including providing control to a user).

Accordingly, by using embodiments of the present invention a drive can be migrated to a second system and used, ensuring drive coherency and no more than a small amount of loss of user data from the first system (e.g., after a system failure). However, after use on the second system, if the drive is brought back to the original system, a drive signature will match what is in the cache, and the cache will satisfy read hits from stale data in the cache (in embodiments in which the disk cache is a non-volatile memory). To prevent such stale data, use on the second system may be detected in various manners. For example, a number of disk drive spin-ups may be obtained from the drive and compared to a number of spin-ups recorded in the original system (e.g., in the disk cache). If the numbers do not match, this is an indication that the data in the disk cache is not coherent, and thus the data in the cache may be invalidated to avoid data corruption. Or another count, such as a power-cycle count of the disk drive may be checked to test for disk separation.

Figure 1:
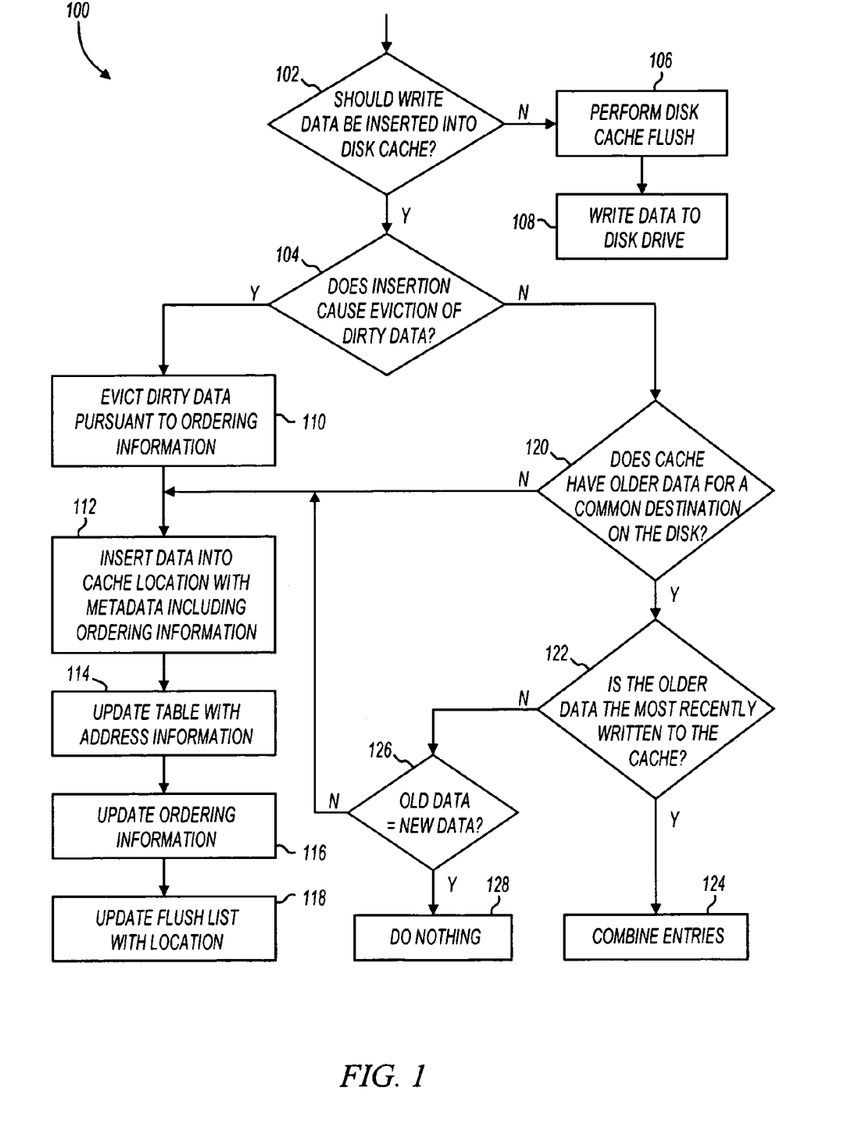
FIGS. 1 and 2 show flowcharts in accordance with various embodiments of the present invention.

Referring now to FIG. 1, shown is a flowchart of a method in accordance with various embodiments of the present invention. As shown in FIG. 1, method 100 may be used to handle incoming write requests from an OS and route them accordingly. In various implementations, method 100 may be performed by a cache control module or a controller within a disk cache although the scope of the present invention is not limited in this regard.

As shown in FIG. 1, method 100 may begin by determining whether write data should be inserted into the disk cache (diamond 102). This determination may be based on various criteria, in different embodiments. For example, the criteria may include the size of the write (i.e., whether it is part of a streaming data access), an available amount of space in the disk cache, or other such criteria. If it is determined that the data should be inserted into the disk cache, control passes to diamond 104, where it may be determined whether the insertion causes eviction of dirty data. If so, control passes to block 110. There, data may be evicted pursuant to ordering information (block 110). That is, ordering information may be used to indicate a write order in which the write requests for the data being evicted was received. As will be described further below, in some embodiments, such ordering information may be part of a flush list. Froin block 110, control passes to block 112.

From block 112 to block 118, operations are performed to write a new cache entry with a new sequence number. At 112, the data is written into a selected cache location along with metadata. This metadata may include the ordering information that indicates a write order in which the write request for the data was received. As one example, the ordering information may correspond to a sequence number stored with the metadata of the write request. This metadata may further include other identifying information, such as address information including a logical block address (LBA) provided by the OS, indicator information to indicate the cache line to which the data is written, a valid or dirty indicator, a flush epoch boundary indication, and other such data.

At block 114, a table such as a hash table or other address translation table may be updated with the address information. For example, a hash table that maintains a list of LBAs of various write requests and the associated disk cache memory locations in which the data of the write requests are stored may be updated. Furthermore, ordering information may be updated (block 116). Continuing with the example of ordering information that is a sequence number, the sequence number may be incremented so that a later incoming write request is associated with an incremented number to indicate its correct write order. While described herein as a sequence number, other implementations may provide ordering information in other manners. For example, a timestamp may be associated with incoming write requests that can equally function as ordering information.

In some embodiments a flush list may be maintained in the disk cache. Such a flush list may correspond to an ordering list in which write requests in the disk cache are to be flushed out to the disk drive. In these implementations, the flush list may be updated to include the memory location at which the present write request was inserted (block 118).

If at diamond 104, it is determined that the insertion does not cause eviction of dirty data, control passes to diamond 120. There, a determination is made whether the cache has older data for a common destination on the disk. For example, the cache may include dirty data destined for the same LBA or sector as the data to be written. If it is determined that the cache does not include older data for a common destination, then control passes to block 112 and a new write-ordered cache entry is created as described above. If it is determined that the cache does include older data for a common destination on the disk, control is passed to diamond 122 and further processing is performed to determine if the new entry can be combined with an old entry, or if the new entry can be discarded.

At diamond 122, a determination is made whether the older data is the most recently written cache entry. If so, control is passed to block 124 where the old and new entries can be combined. The entries can be safely combined because they would be written to the disk sequentially to the disk with no intervening disk writes in the event that they were not combined. By combining the two entries, disk writes can be reduced by one without creating a situation where the disk could be corrupted. In some embodiments, the disk state will remain consistent if the earlier write is skipped entirely. The disk state will skip a state but it will go atomically from one valid state to another. In these embodiments, combining entries at 124 corresponds to replacing the older data with the new data.

If at diamond 122, it is determined that the older data is not the most recently written cache entry, control is passed to diamond 126 where it is determined whether the old and new data are identical. If the old and new data are identical, then the new entry may be discarded at block 128. If the old and new data are not identical, then control passes to block 112 and a new write ordered cache entry is created as described above.

Accordingly, the latency associated with directly writing data to a disk drive responsive to a write request may be avoided by insertion into the disk cache. Then at a later time, e.g., at an idle time of the system, lazy writes may be effected to write back dirty data in the disk cache to the disk drive. When writing back such dirty data, the writebacks may occur in write order, e.g., in the same order in which the data was written into the disk cache. In implementations using a flush list, the location listed at the top of the flush list may be the first dirty data location to be written to the disk drive, and so forth. Note that instead of a flush list, in some embodiments ordering information alone (e.g., a sequence number) may instead be used to effect writebacks to the disk drive in the correct write order.

Still referring to FIG. 1, if instead at diamond 102 it is determined that the write data should not be inserted into the disk cache, control passes to block 106. There a disk cache flush may be performed (block 106). That is, to maintain write ordering in this situation, all dirty data in the disk cache is written out to the disk drive prior to writing the data of the current write request (e.g., of diamond 102). This flush may be performed in the order in which data was written into the disk cache by the OS. This flush may also be performed using method 200 (FIG. 2) or the embodiments described below with reference to Table 2. After completion of such flushing, the data of the current write request may be written to the disk drive (block 108).

While described with this particular implementation in the embodiment of FIG. 1, it is to be understood that the scope of the present invention is not so limited and other manners of maintaining write ordering of write requests handled by a disk cache may be realized.

Referring now to Table 1, shown is example pseudo-code of a method in accordance with various embodiments of the present invention. As shown in Table 1, the pseudo-code may be used to perform disk subsystem write operations responsive to a disk subsystem write request from an OS.

TABLE 1

DiskSubsystemWrite (LBA X, Data D__new)

Decide whether X should be inserted in the cache.   // Any caching policy may be used for this,
                                                        // including estimation of cost of non-
insertion
If (X should be inserted in the cache) then
    If (a cache line containing X is already in the cache at location L__old)
        Let S__old – the sequence number stored in the metadata at L__old
        Let D__new = the data stored at L__old
        //this was the last cache line written
        If (S__old == S__global)
            Write Data D__new to L__old
        Else if (D__new == D__old)

TABLE 1-continued

DiskSubsystemWrite (LBA X, Data D_new)

```
            Do nothing
    Else
            Identify location L_new in the cache where X should be stored.
            Increment S_global
            S_new = S_global
            Add D to the cache at location L_new, with metadata including valid,
                dirty, X and S_new information.
            Update the hashtable so that X points to L_new.
            Add L_new to the end of ToBeFlushed list.
    Else
            Identify location L_new in the cache where X should be stored.
            Increment S_global
            S_new = S_global
            Add D to the cache at location L_new, with metadata including valid,
                dirty, X and S_new information.
            Update the hashtable so that X points to L_new.
            Add L_new to the end of ToBeFlushed list.
    Else
        CacheDirtyFlush ( )
        Write D to the cached disk at address X
End if
```

As shown in Table 1, the write request received from the OS may take the form of a disk subsystem write request that includes a logical block address (e.g., corresponding to a disk sector number) and the data to be written thereto. As shown in Table 1, first it may be determined whether the data should be inserted into the cache or sent directly to the drive. If it is determined that the data should be stored in the cache, the data is stored at an identified location along with metadata including a sequence number of the write request from the OS. Furthermore, an address table may be updated to associate the disk's sector number with the cache location (i.e., cache line). Then the sequence number may be incremented and the cache line location may be added to a cache flush list. If instead it is decided that the data should not be cached, all dirty data may be flushed to disk (e.g., via a second algorithm). After flushing the dirty data, the data corresponding to the write request is written to the requested disk sector.

Also shown in Table 1, cache entries may be combined if they are to a common destination on the disk and they are sequential entries with no intervening writes. Further, the current cache entry to be written may be discarded if it is a duplicate of an earlier cache entry for a common entry on the disk regardless of whether the old and new have intervening writes between them.

Figure 2:
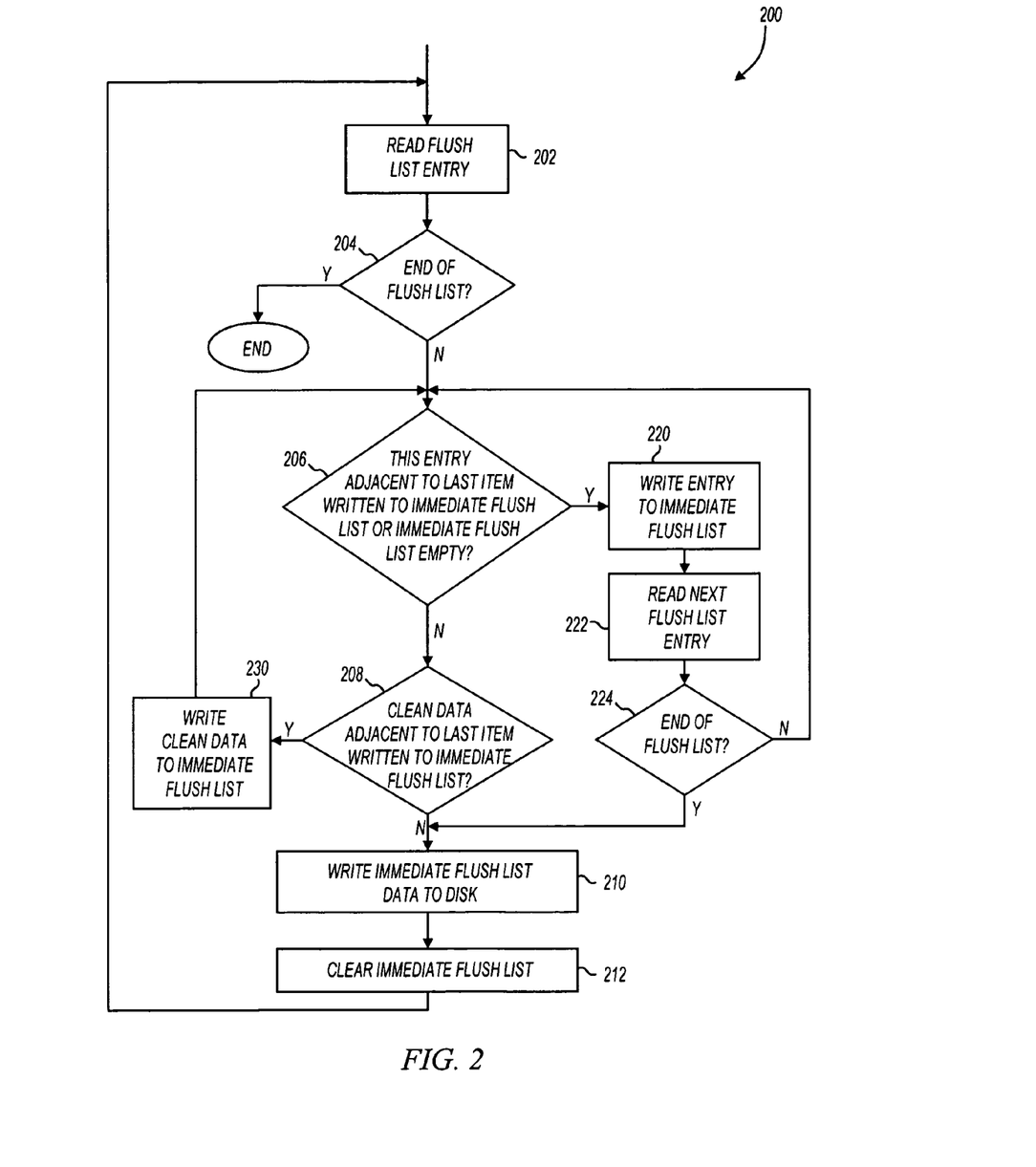

Referring now to FIG. 2, shown is a flow diagram of a method of flushing data in accordance with various embodiments of the present invention, which also may be performed using a cache control module or a controller of a disk cache. Method 200 builds an "immediate flush list" using dirty data (and possibly clean data) from the cache. Data referenced by the immediate flush list is then written to disk. During the operation of method 200, the immediate flush list may be populated and written to the disk multiple times.

As shown in FIG. 2, method 200 may begin by reading an entry in a flush list (block 202). Specifically, to maintain write ordering, the entry at the top of the flush list (e.g., corresponding to the oldest dirty data in the disk cache) is selected for write back to the disk drive. Next, it may be determined whether the end of the flush list has been reached (diamond 204). If so, method 200 may conclude. If not, control passes to diamond 206.

At diamond 206, the immediate flush list and the flush list entry are examined. If the immediate flush list is empty, or if the flush list entry is adjacent (on disk) to the last item written to the immediate flush list, then control passes to block 220, where the flush list entry is written as an item to the immediate flush list. When this occurs, then the two most recently written immediate flush list items are adjacent on the disk. From block 220, the next flush list entry is read at block 222, and at diamond 224, method 200 determines whether the end of the flush list has been reached. If the end of the flush list has not been reached, control passes back to diamond 206.

If, at diamond 206, the flush list is not empty and the flush list entry is not adjacent to the last item written to the immediate flush list, control passes to diamond 208. At diamond 208, method 200 determines if the cache holds clean data adjacent (on disk) to the last item written to the immediate flush list. If so, the clean data is written as an item to the immediate flush list at 230. When this occurs, then the two most recently written immediate flush list items are adjacent on the disk. From block 230, control proceeds back to diamond 206.

Data corresponding to the immediate flush list is written to the disk at 210 if either no adjacent clean data is found at diamond 208, or if the end of the flush list is detected at diamond 224. At block 212, the immediate flush list is cleared to ready it for another disk write request, and the process starts again at block 202 to determine if another immediate flush list can be populated.

As shown in FIG. 2, method 200 fills gaps between dirty entries in the immediate flush list with clean cache data as available. For example, while traversing the flush list, method 200 may add clean cache entries to the immediate flush list if those clean entries are adjacent on the disk to entries already in the immediate flush list. Adding clean entries to the immediate flush list may allow the combining of multiple dirty entries into a single write request that otherwise would not be combinable. For example, two consecutive (in time) dirty cache entries may be separated by a gap on the disk. If one or more clean cache entries correspond to the gap, then by adding them to the immediate flush list, the two dirty entries may be combined into a single write request.

Method 200 may also update cache lines in the disk cache corresponding to the cache entries written out to disk. The manner of updating the cache line may depend on the state of the information written to disk. For example, if the cache line written to disk was the most recent version of the data stored into the disk cache, the cache line may be updated as being clean. Otherwise, the cache line may be updated as being empty/invalid/free.

In some embodiments, dirty data may be flushed in a single disk write as long as the disk write contains all the most dirty data (even if it is out of order within the disk write itself). In these embodiments, an immediate flush list may be built using most dirty data in the flush list. In some embodiments, building an immediate flush list with adjacent (on disk) entries may take into account the write ordering of entries without requiring that adjacent entries are sequential without intervening writes. This allows "N" adjacent dirty cache lines to be written to disk in a single disk request as long as they are the N oldest dirty cache lines in the cache even if the oldest cache line is not the first one in the disk write.

Further, in some embodiments, dirty data may be flushed out of order between OS flushes. In these embodiments, whenever a flush or sync command arrives to the drive, the next dirty cache line written is marked with a bit that indicates it is the start of a flush epoch. This is described above with reference to FIG. 1. A flush epoch thus consists of all the cache lines written to disk between OS flush requests. All the dirty data to be written within a flush epoch may then be written in any order that minimizes the time to flush the data rather than requiring that the data be flushed in the exact same order it arrived at the disk cache.

Note that to perform power-failure recovery, a cache flush may be performed. In that case, a flush list may first be reconstructed with a scan of all valid metadata entries in the cache, and sorting those entries by sequence number. That is, in some embodiments the sequence number may be used to both identify write ordering and to identify the most recent version of a logical cache line if it is written to more than one physical location. Thus the same sequence number used for write ordering may also be used to correctly recover logical to physical cache line mappings.

Referring now to Table 2, shown is pseudo-code of a cache flush method in accordance with various embodiments of the present invention.

TABLE 2

CacheFlush ( )

While (ToBeFlushed list not empty)
   ToBeFlushedNow list = empty
   Move Head(ToBeFlushed list) to the Tail(ToBeFlushedNow list)
   lookAtNextElement = True
   while (lookAtNextElement == True)
      if Head( ToBeFlushed list) is adjacent on disk to
      Tail(ToBeFlushedNow list)
         Move Head(ToBeFlushed list) to the Tail(ToBeFlushedNow
         list)
      Else if cache line adjacent on disk to Tail(ToBeFlushedNow list)
is clean in cache
         Add clean adjacent line to the Tail(ToBeFlushedNow list)
      Else
         lookAtNextElement = FALSE
      if ( length(ToBeFlushedNow list) > MaxDesiredDiskRequest)
         lookAtNextElement = FALSE
   end while
   Strip all cleans lines from the Tail(ToBeFlushedNow list)
   Write all lines on ToBeFlushed now list to disk
End while As shown in Table 2, a cache flush method may process data in a cache flush list so that data is sequentially written out to disk based on its order in the cache flush list. Further, adjacent (on disk) dirty and clean cache entries may be combined into an immediate flush list (ToBeFlushedNow list). Cache data referred to in the immediate flush list may then be written to the disk. In some embodiments, a combination of clean and dirty data is written to the disk to create a larger disk write. The extra overhead of including some clean data in the disk write is outweighed by the savings provided by fewer disk write requests. After writing cache entries out to the disk, the cache location may be updated to evict the location or mark it clean. Furthermore, the entry in the flush list corresponding to that cache location may be removed. While described with this particular manner in the pseudo-code of Tables 1 and 2, it is to be understood that the scope of the present invention is not limited in this regard.

Figure 3:
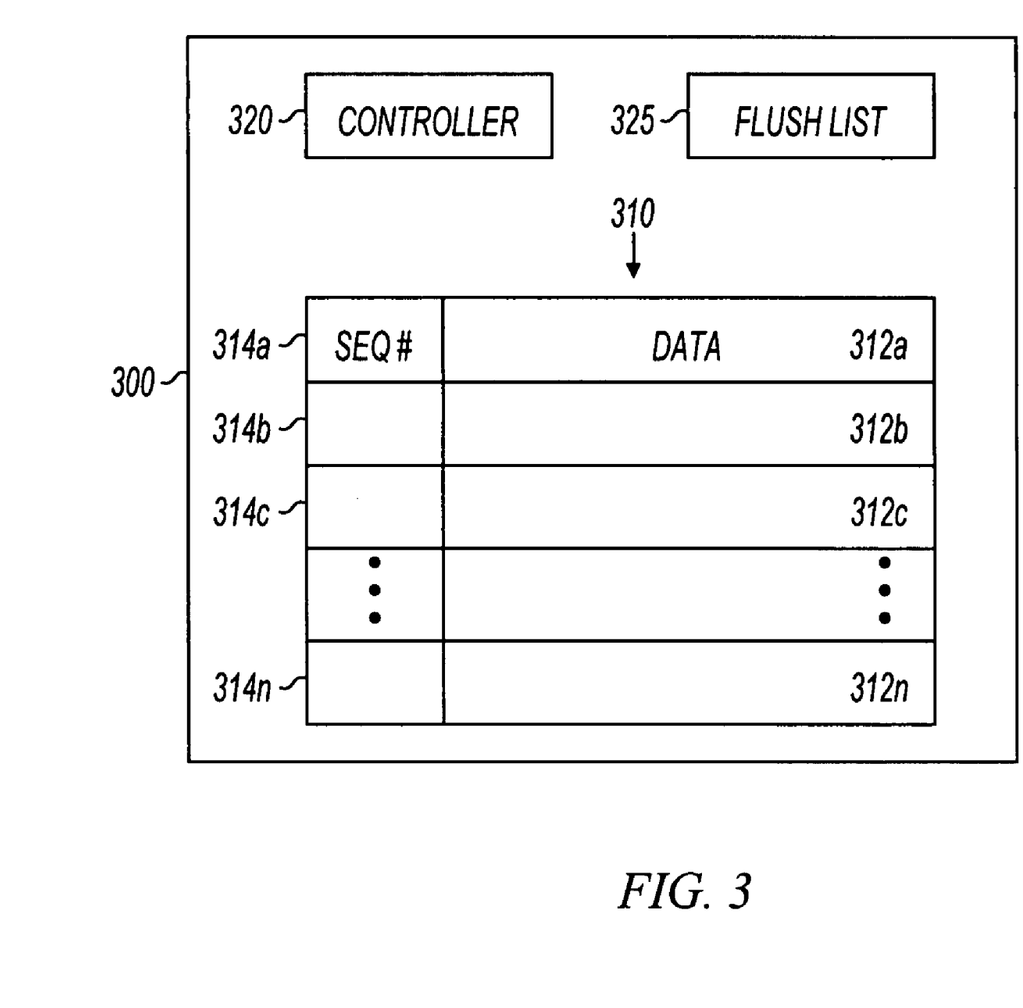
FIG. 3 shows a block diagram of a non-volatile memory in accordance with various embodiments of the present invention.

Referring now to FIG. 3, shown is a block diagram of a non-volatile memory in accordance with one embodiment of the present invention. As shown in FIG. 3, non-volatile memory 300 may include a memory array 310 that includes storage for various data. Specifically, as shown in FIG. 3, memory array 310 includes a plurality of entries each including data 312a-312n (generically, data 312) and an associated sequence number 314a-314n (generically, sequence number 314). When data 312 is stored in memory array 310, its associated sequence number 314 may be written by a controller 320, which may be used to perform embodiments of the present invention.

As further shown in FIG. 3, non-volatile memory 300 may further include a flush list 325, which may include entries in a list form, with each entry corresponding to a disk write request received from an OS. Thus, flush list 325 may be maintained in a first-in-first-out manner such that the top of flush list 325 corresponds to the oldest-in-time write request in memory array 310. While shown as a separate component 325, it is to be understood that in various embodiments, flush list 325 may be part of memory array 310. Furthermore, in some embodiments a separate flush list may not be present and instead sequence numbers 314 may be used to control write ordering in accordance with an embodiment of the present invention.

Controller 320 is an example of a cache control module that may be used to write and read sequence numbers 314 and flush list 325 and to ensure write backs from non-volatile memory 300 to a disk drive maintain write ordering. Furthermore, controller 320 may be used to implement various activities, such as resetting memory array 310 when an associated disk drive is returned to a system after usage outside of the system, to avoid data corruption issues. Of course, controller 320 may perform other activities with respect to non-volatile memory 300. Furthermore, while described as a controller, it is to be understood that a cache control module may take the form of various hardware, software (such as a driver), firmware or combinations thereof, in different embodiments.

Figure 4:
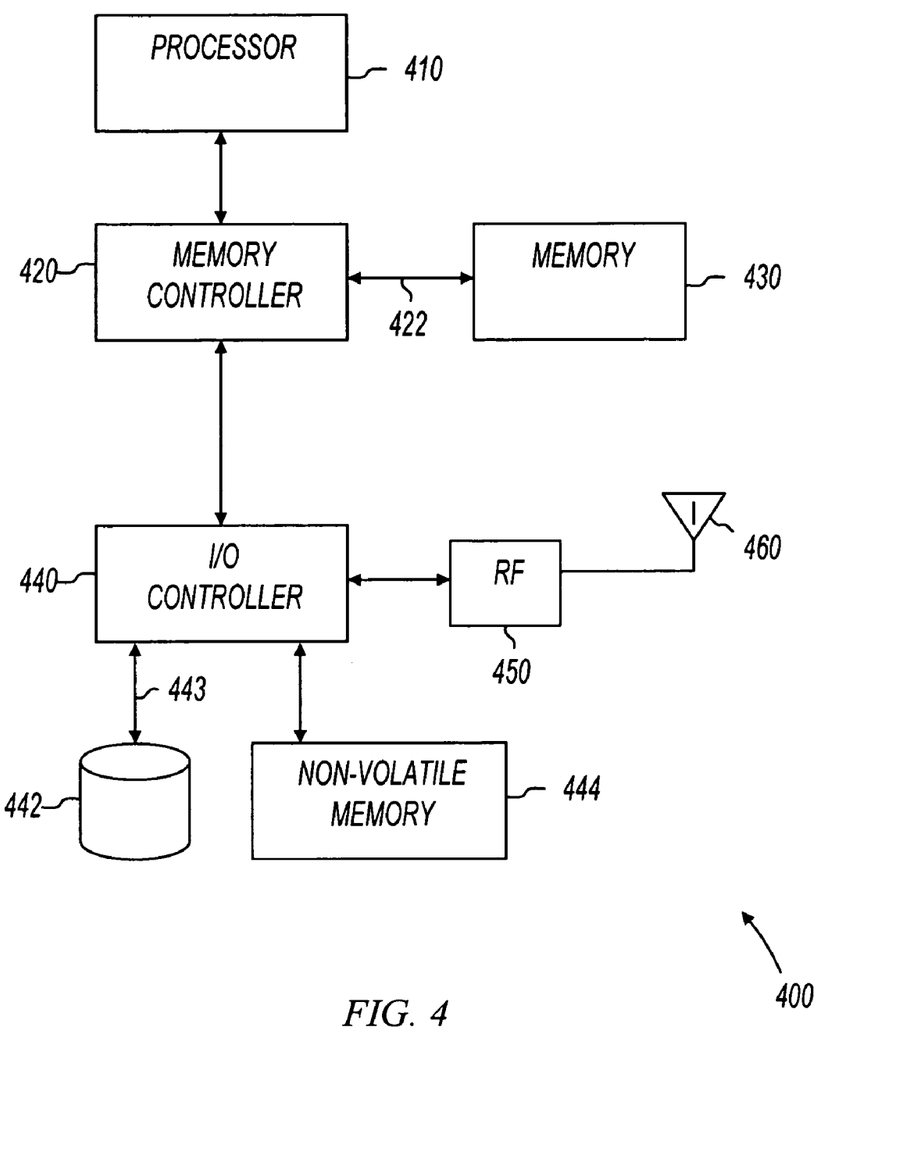
FIGS. 4 and 5 show block diagrams of electronic systems in accordance with various embodiments of the present invention.

FIG. 4 shows an electronic system in accordance with various embodiments of the present invention. Electronic system 400 includes processor 410, memory controller 420, memory 430, input/output (I/O) controller 440, disk drive 442, non-volatile memory 444, radio frequency (RF) circuits 450, and antenna 460. In operation, system 400 sends and receives signals using antenna 460, and these signals are processed by the various elements shown in FIG. 4. Antenna 460 may be a directional antenna or an omni-directional antenna. As used herein, the term omni-directional antenna refers to any antenna having a substantially uniform pattern in at least one plane. For example, in some embodiments, antenna 460 may be an omni-directional antenna such as a dipole antenna, or a quarter wave antenna. Also for example, in some embodiments, antenna 460 may be a directional antenna such as a parabolic dish antenna, a patch antenna, or a Yagi antenna. In some embodiments, antenna 460 may include multiple physical antennas.

Radio frequency circuit 450 communicates with antenna 460 and I/O controller 440. In some embodiments, RF circuit 450 includes a physical interface (PHY) corresponding to a communications protocol. For example, RF circuit 450 may include modulators, demodulators, mixers, frequency synthesizers, low noise amplifiers, power amplifiers, and the like. In some embodiments, RF circuit 450 may include a heterodyne receiver, and in other embodiments, RF circuit 450 may include a direct conversion receiver. In some embodiments, RF circuit 450 may include multiple receivers. For example, in embodiments with multiple antennas 460, each antenna may be coupled to a corresponding receiver. In operation, RF circuit 450 receives communications signals from antenna 460, and provides analog or digital signals to I/O controller 440. Further, I/O controller 440 may provide signals to RF circuit 450, which operates on the signals and then transmits them to antenna 460.

Processor 410 may be any type of processing device. For example, processor 410 may be a microprocessor, a microcontroller, or the like. Further, processor 410 may include any number of processing cores, or may include any number of separate processors.

Memory controller 420 provides a communications path between processor 410 and other devices shown in FIG. 4. In some embodiments, memory controller 420 is part of a hub device that provides other functions as well. As shown in FIG. 4, memory controller 420 is coupled to processor 410, I/O controller 440, and memory 430.

Memory 430 may be any type of memory technology. For example, memory 430 may be random access memory (RAM), dynamic random access memory (DRAM), static random access memory (SRAM), non-volatile memory such as FLASH memory, or any other type of memory.

Memory 430 may represent a single memory device or a number of memory devices on one or more memory modules. Memory controller 420 provides data through bus 422 to memory 430 and receives data from memory 430 in response to read requests. Commands and/or addresses may be provided to memory 430 through conductors other than bus 422 or through bus 422. Memory controller 420 may receive data to be stored in memory 430 from processor 410 or from another source. Memory controller 420 may provide the data it receives from memory 430 to processor 410 or to another destination. Bus 422 may be a bi-directional bus or unidirectional bus. Bus 422 may include many parallel conductors. The signals may be differential or single ended.

Memory controller 420 is also coupled to I/O controller 440, and provides a communications path between processor 410 and I/O controller 440. I/O controller 440 includes circuitry for communicating with I/O circuits such as serial ports, parallel ports, universal serial bus (USB) ports, and the like. As shown in FIG. 4, I/O controller 440 provides a communications path to RF circuits 450, hard disk 442, and non-volatile memory 444. Non-volatile memory 444 may be utilized as a disk cache such as memory 300 (FIG. 3). In some embodiments, non-volatile memory 444 may be platform-based, which means that the memory is more closely coupled to I/O controller 440 than to hard disk 442. For example, non-volatile memory 444 may be mountable on a motherboard or other rigid structure housing processor 410, memory controller 420, and I/O controller 440.

Hard disk 442 may be any type of hard disk. In some embodiments, hard disk 442 is loosely coupled to the remaining elements shown in FIG. 4, such that non-volatile memory 444 is "remote" from hard disk 442. For example, hard disk 442 is coupled to I/O controller 440 by bus 443. Bus 443 may be any type of bus utilizing any type of protocol; and may be any type of physical connection, including but not limited to, one or more flexible cables.

Figure 5:
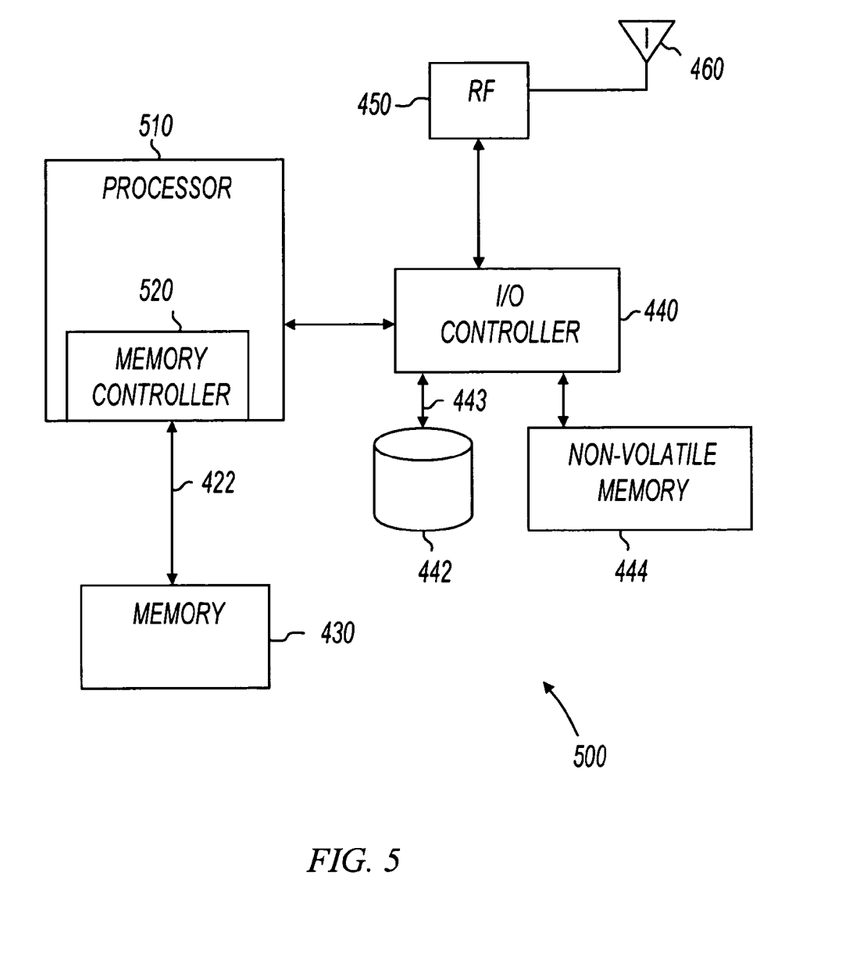

FIG. 5 shows an electronic system in accordance with various embodiments of the present invention. Electronic system 500 includes memory 430, I/O controller 440, disk drive 442, non-volatile memory 444, RF circuits 450, and antenna 460, all of which are described above with reference to FIG. 4. Electronic system 500 also includes processor 510 and memory controller 520. As shown in FIG. 5, memory controller 520 is included in processor 510. Processor 510 may be any type of processor as described above with reference to processor 410 (FIG. 4). Processor 510 differs from processor 410 in that processor 510 includes memory controller 420, whereas processor 410 does not include a memory controller.

Example systems represented by FIGS. 4 and 5 include desktop computers, laptop computers, cellular phones, personal digital assistants, wireless local area network interfaces, or any other suitable system. Many other systems uses for write ordering exist. For example, the write ordering embodiments described herein may be used in a server computer, a network bridge or router, or any other system with or without an antenna.

Embodiments may be implemented in code and may be stored on a machine-accessible medium such as a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
    performing at least two data writes to entries in a disk cache, wherein the at least two data writes are for a common destination on a disk, the common destination comprising overlapping logical block addresses, and the at least two data writes each include sequence information to identify an order in which write requests corresponding to the at least two data writes were received; and
    combining data from the at least two data writes into a single entry in the disk cache when the sequence information for the at least two data writes indicate that they are to be written to the disk sequentially with no intervening writes in between the order the at least two writes were received, wherein combining data includes
        discarding a most recent of the at least two data writes when their data is the same, otherwise
        creating the single entry to include a result of the at least two data writes based on their sequence information;

wherein performing at least two writes to a disk cache comprises performing at least two writes to a non-volatile cache memory remote from a disk.

2. The method of claim 1 further comprising flushing entries in the disk cache without regard to order only when the entries are to be flushed with a single disk write and are the most dirty entries.

3. The method of claim 1 further comprising flushing entries in the disk cache to the disk in the order specified by the sequence information.

4. The method of claim 3 wherein flushing includes combining clean cache entries with dirty cache entries to effect a single large write to the disk rather than multiple smaller writes to disk.

5. The method of claim 4 wherein the clean cache entries are located between the dirty cache entries on the disk.

6. The method of claim 1 wherein performing the at least two data writes comprises writing an indication to identify a flush epoch boundary and in which all data written within a flush epoch can be written to disk without regard to order.

7. An article of manufacture comprising a machine-readable storage medium that provides instructions that, if executed by the machine, will cause the machine to perform operations comprising:

performing at least two data writes to entries in a disk cache, wherein the at least two data writes are for a common destination on a disk, the common destination comprising overlapping logical block addresses, and the at least two data writes each include sequence information to identify an order in which write requests corresponding to the at least two data writes were received; and combining data from the at least two data writes into a single entry in the disk cache when the sequence information for the at least two data writes indicate that they are to be written to the disk sequentially with no intervening writes in between the order the at least two writes were received, wherein combining data includes discarding a most recent of the at least two data writes when their data is the same, otherwise creating the single entry to include a result of the at least two data writes based on their sequence information;

wherein performing at least two writes to a disk cache comprises performing at least two writes to a non-volatile cache memory remote from a disk.

8. The article of manufacture of claim 7, the operations further comprising flushing entries in the disk cache without regard to order only when the entries are to be flushed with a single disk write and are the most dirty entries.

9. The article of manufacture of claim 7, the operations further comprising flushing entries in the disk cache to the disk in the order specified by the sequence information.

10. The article of manufacture of claim 9, wherein flushing includes combining clean cache entries with dirty cache entries to effect a single large write to the disk rather than multiple smaller writes to disk.

11. The article of manufacture of claim 10, wherein the clean cache entries are located between the dirty cache entries on the disk.

12. The article of manufacture of claim 7, wherein performing the at least two data writes comprises writing an indication to identify a flush epoch boundary and in which all data written within a flush epoch can be written to disk without regard to order.

* * * * *